(12) United States Patent
Li

(10) Patent No.: US 11,480,921 B2
(45) Date of Patent: Oct. 25, 2022

(54) METHOD FOR GENERATING A HOLOGRAPHIC IMAGE, PROCESSOR, HOLOGRAPHIC IMAGE DISPLAY DEVICE, AND APPARATUS

(71) Applicants: SHENZHEN MEIYUJINGJIE PHOTOELECTRIC TECHNOLOGY CO., LTD, Shenzhen (CN); Ke Li, Shenzhen (CN)

(72) Inventor: Ke Li, Shenzhen (CN)

(73) Assignees: SHENZHEN MEIYUJINGJIE PHOTOELECTRIC TECHNOLOGY CO., Shenzhen (CN); Ke Li, Shenzhen (CN)

( * ) Notice: Subject to any disclaimer, the term of this patent is extended or adjusted under 35 U.S.C. 154(b) by 544 days.

(21) Appl. No.: 16/576,986

(22) Filed: Sep. 20, 2019

(65) Prior Publication Data
US 2020/0012234 A1  Jan. 9, 2020

Related U.S. Application Data

(63) Continuation of application No. PCT/CN2018/073111, filed on Jan. 18, 2018.

(30) Foreign Application Priority Data

Mar. 27, 2017 (CN) .......................... 201710190158.3

(51) Int. Cl.
*G03H 1/26* (2006.01)
*G03H 1/02* (2006.01)
*G03H 1/22* (2006.01)

(52) U.S. Cl.
CPC ................ *G03H 1/26* (2013.01); *G03H 1/02* (2013.01); *G03H 1/2202* (2013.01); *G03H 2001/0224* (2013.01); *G03H 2001/2244* (2013.01)

(58) Field of Classification Search
None
See application file for complete search history.

(56) References Cited

U.S. PATENT DOCUMENTS

| 9,993,149 B2 * | 6/2018 | Chung | ............... G02B 26/0833 |
| 2010/0007930 A1 * | 1/2010 | Cowburn | ............. G07D 7/2033 |
| | | | 382/218 |

(Continued)

FOREIGN PATENT DOCUMENTS

CN     102542581 B   *  4/2014  ........... G03H 1/0808

OTHER PUBLICATIONS

English Translation of Written Opinion of the International Searching Authority of PCT/CN2018/073111—dated Apr. 8, 2018. (Year: 2018).*

*Primary Examiner* — Jennifer D. Carruth
(74) *Attorney, Agent, or Firm* — Hemisphere Law, PLLC; Zhigang Ma

(57) ABSTRACT

A method for generating a holographic image, a signal processor, a holographic image display device, a wearable apparatus, and an onboard head-up display apparatus. The method comprises: performing holographic transformation on the basis of a target amplitude phase distribution of a target image to obtain a holographic phase image; performing phase quantization of the holographic phase image to obtain a quantized holographic image; performing inverse holographic transformation of the quantized holographic image to obtain a reconstructed image; if the reconstructed image satisfies a preset condition, determining that the quantized holographic image is a target holographic image; if not, constraining the amplitude phase of the reconstructed image and, on the basis of the amplitude phase constrained image, continuing iteration. The present method can rapidly and effectively implement monochrome or multi-colour (Continued)

high contrast ratio, low noise real-time holographic image generation and display, and the imaging distance can be freely adjusted.

23 Claims, 10 Drawing Sheets

(56) References Cited

U.S. PATENT DOCUMENTS

2013/0100241 A1* 4/2013 Sato ................... G03H 1/0443
  348/40
2015/0036038 A1* 2/2015 Horstmeyer ....... G02B 21/0056
  348/360
2018/0173083 A1* 6/2018 Okumura .............. G03B 21/00

* cited by examiner

METHOD FOR GENERATING A HOLOGRAPHIC IMAGE, PROCESSOR, HOLOGRAPHIC IMAGE DISPLAY DEVICE, AND APPARATUS

TECHNICAL FIELD

The present invention relates to imaging display technical field, and more particularly to a method for generating a holographic image, a processor, a holographic image display device, and apparatus.

BACKGROUND

With the development of image processing technology, the hologram and holographic projection have a broad prospect of application in our daily life and production work. Specifically, the hologram and the holographic projection can be widely used in image display, optical storage encryption, diffraction element design, optical communication, printing, etc. Especially in the display field, the hologram and the holographic projection have energy utilization rate far higher than the traditional projection, and have advantages such as outdoor high brightness, small volume, simplified structure, no bad point, good stability, etc. Thus, the hologram can be used to achieve large screen 2D/3D projection, car head-up display, wearing augmented reality, etc.

Traditional methods for generating a holographic image use Gerchberg-axton (GS) Algorithm, Iterative Fourier Transform Algorithm (IFTA) Algorithm, Simulated Annealing Algorithm (Simulated Annealing), etc. However, these methods have a common weakness that their effect is influenced by the number of iterations. Too large computation, easy stagnation after iterating for several times, and non-continuing convergence of error result in decreased quality of the reconstructed image, more noise, long operation time. Even though the number of iterations is continuously increased, the noise cannot be reduced, reconstruction image quality is poor and real-time display of the image is almost unable to be realized. In addition, although visual staying effect can be used to rapidly overlay a hologram to reduce the noise in a short period, but the effect still cannot meet the demands.

SUMMARY OF THE INVENTION

In view of the above problems, therefore, a method for generating a holographic image, a processor, a holographic image display device, and apparatus are provided in the present invention, which is to overcome or at least partially solve the above problems.

In one aspect of the present invention, a method for generating a holographic image is provided, which includes:

performing holographic transformation on the basis of a target amplitude phase distribution of a target image to obtain a holographic phase image corresponding to the target image;

performing phase quantization of the holographic phase image to obtain a quantized holographic image;

performing inverse holographic transformation of the quantized holographic image to obtain a reconstructed image corresponding to the target image;

if the reconstructed image satisfies a preset condition, then determining that the quantized holographic image is a target holographic image;

if not, constraining the amplitude phase of the reconstructed image corresponding to the target image and, on the basis of the amplitude phase constrained image, continuing iteration.

In another aspect of the present invention, a signal processor is provided, which includes:

a holographic transformation unit configured for performing holographic transformation on the basis of a target amplitude phase distribution of a target image to obtain a holographic phase image corresponding to the target image;

a phase quantization unit configured for performing phase quantization of the holographic phase image to obtain a quantized holographic image;

an inverse holographic transformation unit configured for performing inverse holographic transformation of the quantized holographic image to obtain a reconstructed image corresponding to the target image;

a determination unit configured for determining whether the reconstructed image satisfies a preset condition or not, if the reconstructed image satisfies the preset condition, then determining that the quantized holographic image is a target holographic image; and a complex amplitude constraining unit configured for constraining the amplitude phase of the reconstructed image corresponding to the target image if the reconstructed image does not satisfy the preset condition, and returning to the holographic transformation unit for continuing iteration with the holographic transformation unit on the basis of the amplitude phase constrained image.

In one another aspect of the present invention, a holographic image display device is provided, which includes the above-mentioned signal processor, a light resource device, a spatial light modulator SLM, a Fourier lens, a spatial filter, and a projection objective lens. The spatial light modulator SLM is configured to utilize the target holographic image obtained by the signal processor as a source of image, and apply the target holographic image into incident beam of the light source device. The holographic reconstructed image is obtain by performing transmission diffraction transformation and selecting operation with the Fourier lens and the spatial filter, and is enlarged by the projection objective lens, accordingly forming an enlarged corresponding image.

In still another aspect of the present invention, a holographic image display device is provided, which includes the above-mentioned signal processor, a light resource device, a spatial light modulator SLM loaded with digital spherical phase modulation, a spatial filter, and a projection objective lens. The spatial light modulator SLM loaded with digital spherical phase modulation is configured to utilize the target holographic image obtained by the signal processor as a source of image, apply the target holographic image into incident beam of the light source device, and perform transmission diffraction transformation. The holographic reconstructed image is obtain by selecting process with the spatial filter, and is enlarged by the projection objective lens, accordingly forming an enlarged corresponding image.

In accordance with the present invention, a wearable apparatus is provided, which includes a wearable device, a display screen disposed on the wearable device and the above-described holographic image display device. The display screen is coated with a reflection film or a holographic optical element film to form a virtual enlarged image of the projected display image generated by the holographic image display device.

In accordance with the present invention, an onboard head-up display apparatus is provided, which includes a display screen and the above-described holographic image display device. The display screen is coated with a reflection film or a holographic optical element film to form a virtual enlarged image of the projected display image generated by the holographic image display device.

By determining whether the reconstructed image satisfies the preset conditions, the method for generating a holographic image, the processor, the holographic image display device and the apparatus, in accordance with the embodiments of the present invention, can rapidly and efficiently achieve processing and display of real-time holographic image with high contrast and low noise, and can realize free adjustment of imaging distance.

The foregoing content is merely a brief description to the present technical solution in accordance with the present invention. The foregoing and other exemplary purposes, aspects and advantages of the present invention will be better understood in principle from the following detailed description of one or more exemplary embodiments of the present invention with reference to the embodiment(s) and accompanied drawings. It is understood to one skilled in the art is able to clearly understand the technical means of the present invention to implement the present invention with reference to the following exemplary embodiment(s) and accompanied drawings.

BRIEF DESCRIPTION OF THE DRAWINGS

Other advantages and benefits of the present invention will be better understood to one skilled in the art by the following detailed description of one or more exemplary embodiments of the present invention with reference to the embodiment(s) and accompanied drawings. It is understood that the accompanied drawings are merely to show preferred embodiment(s) and explain concepts and principals of the present invention, but should not be seemed as limitation to the scope of the present invention. In addition, the same reference numbers are used in the drawings and the description to refer to the same or like parts, in which.

DETAILED DESCRIPTION OF THE INVENTION

The exemplary embodiments of the present disclosure will be described in detail with reference to the accompanied drawings. Although The exemplary embodiments of the present invention are showed in the accompanied drawings, it is understood that the present disclosure is implemented in various forms and should not be limited by the exemplary embodiments as described below. Instead, these exemplary embodiments are provided for further thoroughly understanding the present disclosure, and for fully conveying the scope of the present to those skilled in the art.

It should be understood to one skilled in the art that, unless defined in this context, all terms used herein (including technical and scientific terms) have the same meaning as those generally understood by one of ordinary skill in the art. It should also be understood that terms such as those defined in a general dictionary should be understood to have meanings consistent with those in the context of traditional arts, and will not be interpreted ideally or too formally unless specifically defined.

Figure 1:
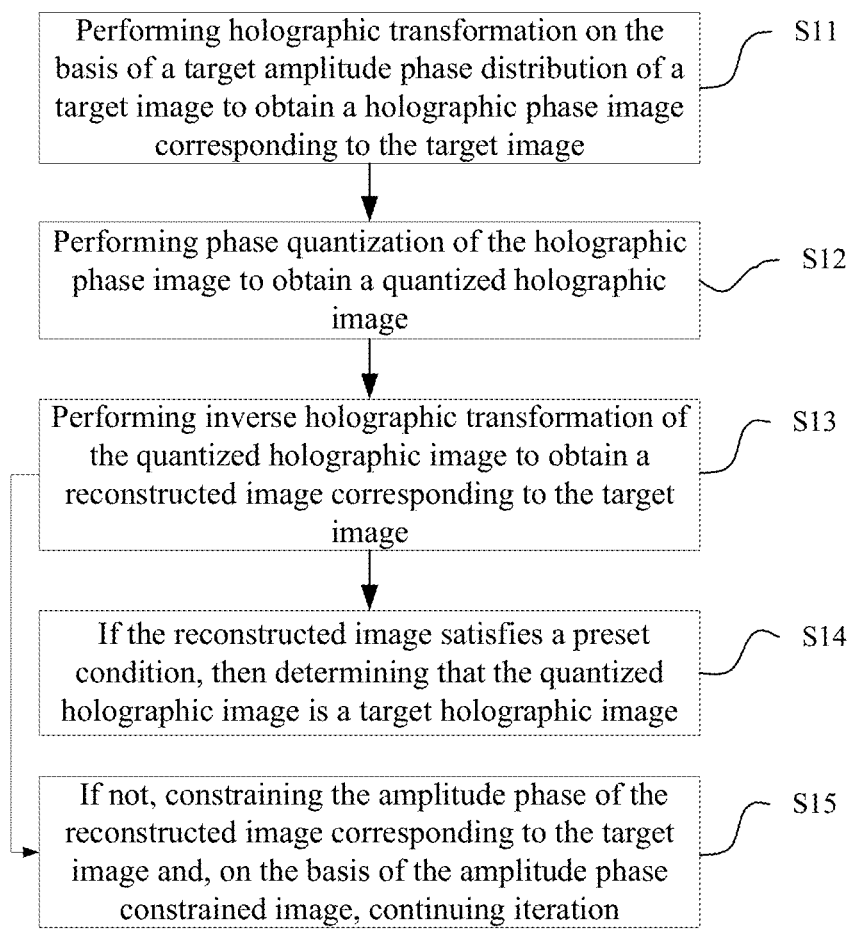
FIG. 1 is a flaw chart of a method for generating a holographic image in accordance with one embodiment of the present invention.

FIG. 1 illustrates a flaw chart of a method for generating a holographic image in accordance with one embodiment of the present invention. Please referring to FIG. 1, the method for generating the holographic image, in accordance with one embodiment of the present invention, includes the following steps:

Step S11, performing holographic transformation on the basis of a target amplitude phase distribution of a target image to obtain a holographic phase image corresponding to the target image. In this step, the holographic transformation is preferably achieved by any of Fourier transform, Fresnel transform, fast Fourier transform, fractional Fourier transform and angular spectrum propagation spatial transform. Specifically, Fresnel transform, fractional Fourier transform and angular spectrum space transform are beneficially used to display 3D holographic images at different distances.

Step S12, performing phase quantization of the holographic phase image to obtain a quantized holographic image;

Step S13, performing inverse holographic transformation of the quantized holographic image to obtain a reconstructed image corresponding to the target image;

Step S14, if the reconstructed image satisfies a preset condition, then determining that the quantized holographic image is a target holographic image;

Step S15, if not, constraining the amplitude phase of the reconstructed image corresponding to the target image and, on the basis of the amplitude phase constrained image, continuing iteration.

Figure 2:
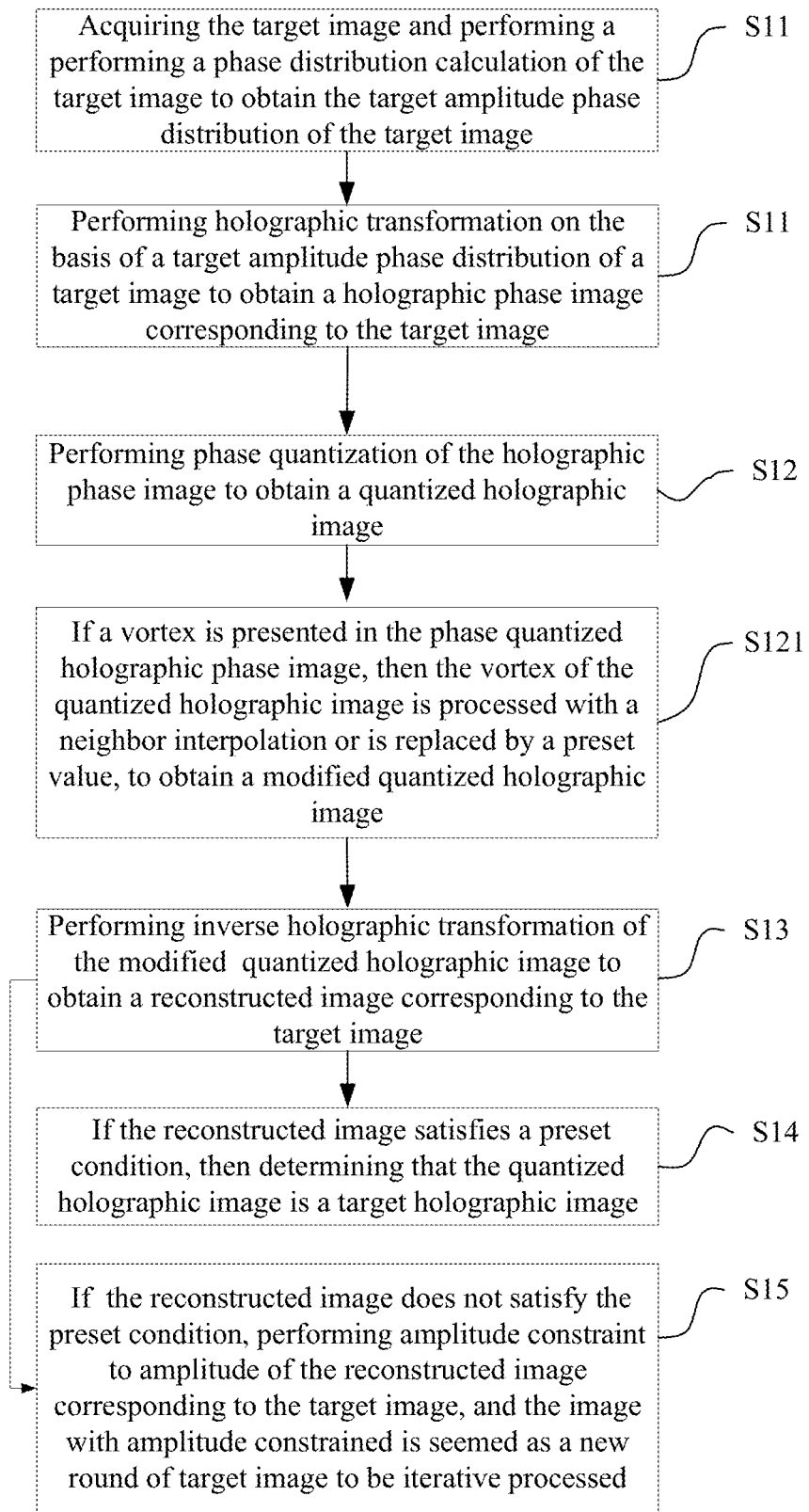
FIG. 2 is another flaw chart of a method for generating a holographic image in accordance with another embodiment of the present invention.

Please referring to FIG. 2, in one preferred embodiment, the following step S10 is further provided prior to performing holographic transformation on the basis of the target amplitude phase distribution of the target image:

Step S10, acquiring the target image and performing a performing a phase distribution calculation of the target image to obtain the target amplitude phase distribution of the target image.

Please referring to FIG. 2, in one preferred embodiment, the following step S121 is further provided after performing the phase quantization of the holographic phase image:

Step S121, if a vortex is presented in the phase quantized holographic phase image, then the vortex of the quantized holographic image is processed with a neighbor interpolation or is replaced by a preset value, to obtain a modified quantized holographic image. Correspondingly, the step of performing inverse holographic transformation of the quantized holographic image to obtain the reconstructed image corresponding to the target image is preferably to perform the inverse holographic transformation of the modified quantized holographic image to obtain the reconstructed image corresponding to the target image.

In practical applications, before calculating the phase distribution of the target image, initial parameters are set, in particular, which include random initial phase $e^{j\varphi(r)}$, target image amplitude $f(p)=\sqrt{I(p)}$, in which I(p) represents target intensity distribution, p=(u, v) represents the image space coordinate, r=(x, y) represents the holographic plane coordinate, the pixel size is M*N, the signal window magnification is Mag, the weight factors are $\omega_1$ and $\omega_2$, the accuracy is $\varepsilon$, the total number of iterations is $N_{max}$, the number of iterations of GS algorithm is $N_{GS}$, the compensation factor is $\alpha_k$, the escape factor is $\gamma$.

Further, before calculating the phase distribution of the target image, the method further includes: adjusting sizes of corresponding color pixels in the target image according to wavelength of various color lasers.

In an exemplary embodiment, a 720p spatial light modulator SLM is usefully used. Provided that $\varphi(p)$ represents a random distribution of $[-\pi, \pi]$, M=480, N=480, Mag=1.5; $\omega_1=2$, $\omega_2=1$; $\varepsilon=1e-6$; $N_{max}=30$, $N_{GS}=5$; $\alpha_1=1$, $\gamma=0.99$.

For multi-colour RGB holographic display, at the same distance z, size of the reconstructed image satisfies: $L_p=\lambda z/\Delta x$, $\Delta x$ is single pixel size of the SLM. Accordingly, the RGB laser will generate reconstructed images with different sizes, and the images cannot overlap. The ratio is $L_R:L_G:L_B=\lambda_R:\lambda_G:\lambda_B$.

Thus, it is necessary to adjust the sizes of the corresponding color pixels in the target image according to the wavelength of various color lasers, so as to adjust sizes of the target image according to various color lasers. If the equation is satisfied: $M_R:M_G:M_B=N_R:N_G:N_B=1/\lambda_R:1/\lambda_G:1/\lambda_B$, accordingly realizing the overlap of image sizes reconstructed by RGB lasers, thus achieving the multi-color holographic display.

Alternatively, the pixel number of red and green images can be adjusted by using the pixel size of blue image as the reference.

In the present embodiment, the phase distribution of the target image is calculated to obtain the amplitude phase distribution of the target $F_k(p)=f_k(p)\exp[j\varphi_k(p)]$, wherein K represents the number of wave and is equal to $2\pi/\lambda$.

Then, a holographic transformation is performed by diffraction transmission of the target amplitude phase distribution $F_k(p)$ and the phase of $F_k(p)$ is acquired, to obtain the hologram $\Phi_k(r)$.

$$G_k(r)=\Im\{F_k(p)\}$$

$$\Phi_k=\text{angle}\{(F_k(r)\}$$

The holographic transform (diffraction propagation function) $\Im\{\ \}$ is usefully the means of, such as Fourier transform, Fresnel transform, fast Fourier transform, fractional Fourier transform, angular spectrum spatial propagation, etc.

Wherein angle( ) is to acquire argument of a complex number.

Specifically, the fast Fourier transform is preferably realized by FFT{ }, IFFT{ }, and the Fresnel transform is preferably realized by Fresnel diffraction formula, as following:

$$U_O(u, v) = \frac{\exp(jkz)}{j\lambda z}\exp\left[\frac{jk}{2z}(u^2+v^2)\right]\Im\left\{\left\{U_I(x, y)\exp\left[\frac{jk}{2z}(x^2+y^2)\right]\right\}\right\}_{f_u=\frac{u}{\lambda z}, f_v=\frac{v}{\lambda z}}$$

A holographic lens less system is optionally formed by the Fresnel transform, thus reducing the volume and aberration of the system. Wherein, $U_I(x, y)$ is complex amplitude distribution of the holographic plane light field, $U_O(u, v)$ is complex amplitude distribution of the image plane light field, k is the number of wave, z is propagation distance from the holographic plane to the image plane, $f_u$ and $f_v$ are spatial frequencies.

Specifically, a formula of the angular spectrum spatial propagation is:

$$U_O(u, v) = IFFT\{FFT\{U_I(x, y)\} \cdot H(f_u, f_v)\}$$

Wherein, $H(f_u, f_v) = \exp\left[ikz\sqrt{1-(\lambda f_u)^2-(\lambda f_v)^2}\right]$, $$\left(f_u=\frac{u}{\lambda z}, f_v=\frac{v}{\lambda z}\right)$$

Wherein $U_I(x, y)$ is the complex amplitude distribution of the holographic plane light field, $U_O(u, v)$ is the complex amplitude distribution of the image plane light field, $H(f_u, f_v)$ is the angular spectrum propagation function, k is the number of wave, z is the propagation distance from the holographic plane to the image plane, and $f_v$ are the spatial frequencies.

Specifically, the Fractional Fourier transform is expressed as:

$$U_O(u, v) = \iint U_I(x, y)\exp\left\{i\pi\tan\left(\frac{\alpha\pi}{4}\right)\left[\frac{x^2+y^2}{\lambda z\tan\left(\frac{\alpha\pi}{2}\right)}+\frac{u^2+v^2}{\lambda z\tan\left(\frac{\alpha\pi}{2}\right)}-\frac{2(ux+vy)}{\lambda z\sin\left(\frac{\alpha\pi}{2}\right)}\right]\right\}dxdy$$

The light diffraction propagation plane calculated the Fractional Fourier Transform comes up to from a rear surface of the lens to infinite distance. Compared with the traditional Fourier Transform which only calculates the light field distribution on the rear focal plane, the Fractional Fourier Transform has a wider scope of application and flexibility. Wherein, $U_I(x, y)$ is the complex amplitude distribution of the holographic plane light field, $U_O(u, v)$ is the complex amplitude distribution of the image plane light field, and $\alpha$ is the order. Due to periodicity of the trigonometric function, the order a has a value ranged from 0 to 2. When the value of the order a is 1, the above formula becomes a standard Fourier transform, k is the number of wave, z is the propagation distance from the holographic plane to the image plane. Then, the phase of the hologram is quantized iteratively, and thus obtaining quantized hologram, namely, $\psi_k(r)=Q\{\Phi_k(r)\}$. In a particular embodiment, $\Phi_k(r)$ uses 256-order phase quantization to achieve iterative quantization of the hologram phase. Specifically, the 256-order phase quantization can be achieved by a variety of ways.

In the present embodiment of the present invention, the quantization calculation operator Q{ } is defined as:

$$Q\{x\} = \begin{cases} -\frac{255\pi}{256} & x \in \left[-\frac{128\pi}{128}, -\frac{127\pi}{128}\right) \\ -\frac{253\pi}{256} & x \in \left[-\frac{127\pi}{128}, -\frac{126\pi}{128}\right) \\ \vdots & \vdots \\ \frac{255\pi}{256} & x \in \left[\frac{127\pi}{128}, \frac{128\pi}{128}\right) \end{cases}$$

Further, before performing phase quantization of the holographic phase image, the method includes: determining quantization order and quantization range of various color lasers according to the wavelength of various color lasers. Specifically, for multi-color RGB holographic display holograms, the phase quantization in practical application is different dependent on different gamma response curves of SLM with respect to different wavelengths.

The phase delay formula of a liquid crystal spatial light modulator is as following:

$$\Delta\varphi = \frac{2\pi}{\lambda}(2h\Delta n)$$

Wherein $\Delta\varphi$ represents phase delay caused by incident light passing through the SLM, $\Delta n=n_e-n_o$ represents refractive index difference, $n_o$ is ordinary refractive index of liquid crystal molecule, $n_e$ is unusual refractive index of liquid crystal molecule, h is thickness of the SLM and $\lambda$ is wavelength.

In one specific example, it is to be selected that quantization height of the gamma response curve at 533 nm green light is $[0,2\pi]$, and quantization step is up to [0,255]. Based on green light, quantization height of 650 nm red light is $[0,1.7\pi]$, quantization step of 650 nm red light is [0,255], quantization height of 450 nm red light is $[0,2\pi]$, and the quantization step of 450 nm red light is [0,217].

Then, the quantized holographic image is processed with a neighbor interpolation to remove zero points, and thus obtaining the modified quantized hologram which is represented as $\psi'_k(r)=M\{\psi_k(r)\}$.

In practical applications, when zero points and vortex effect appear in the quantized hologram, noise of the reconstructed image will be aggravated. Therefore, it is useful to remove the zero value in the hologram after quantization. Specifically, the zero points can be removed by various means, such as by endowing zero points with a minimum value, or performing neighbor interpolation.

In the present embodiment, the neighbor interpolation operator MO is defined as:

$$M\{I(x,y)\} = \frac{\sum_{s=-\frac{R-1}{2},\ldots,\frac{R-1}{2};t=-\frac{C-1}{2},\ldots,\frac{C-1}{2}}^{R\times C} I(x+s, y+t)}{R \times C},$$

When $I(x, y)=0$.

In practical applications, neighbor interpolation of 9 is usefully selected and preferred value is R=3, C=3.

Wherein the removing of zero points is usefully performed in the previous step of quantization, namely avoiding quantization to 0 in the quantization process.

The modified quantized holographic image is performed with the inverse holographic transformation, the reconstructed image $f'_k(p)$ is obtained by the diffraction transmission.

$$F'_k(p)=\Im^{-1}\{\exp[j\psi'_k(r)]\}$$

$$f'_k(P)=\text{abs}\{F'_k(p)\} \varphi'_k(p)=\text{engle}\{F'_k(p)\}$$

The inverse holographic transform (Diffraction Propagation Function) $\Im^{-1}\{\ \}$ may be various means, such as Fourier inverse transform, Fresnel inverse transform, Fast Fourier inverse transform, fractional Fourier inverse transform, angular spectrum space inverse propagation transform, etc.

Wherein abs( ) is to acquire the module of the complex.

Figure 3:
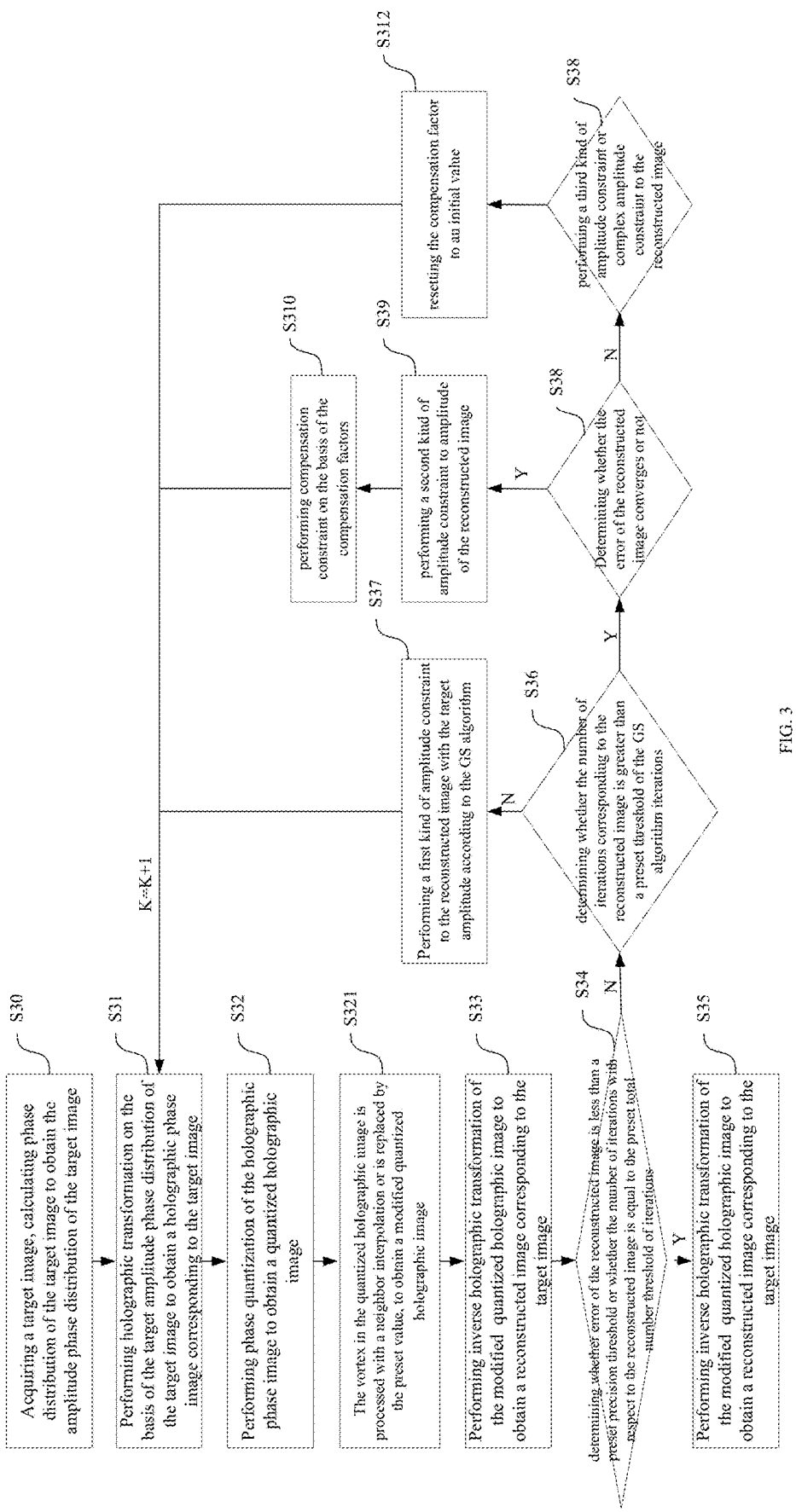
FIG. 3 is still another flaw chart of a method for generating a holographic image in accordance with one another embodiment of the present invention.

FIG. 3 schematically illustrates a flaw chart of another method for generating a holographic image in accordance with another embodiment of the present invention. Referring to FIG. 3, the method for generating the holographic image in accordance with the embodiment of the present invention includes the following steps:

Step S30, acquiring a target image, calculating phase distribution of the target image to obtain the amplitude phase distribution of the target image.

Step S31, performing holographic transformation on the basis of the target amplitude phase distribution of the target image to obtain a holographic phase image corresponding to the target image. In this step, the holographic transformation is preferably achieved by the means of, such as Fourier transform, Fresnel transform, fast Fourier transform, fractional Fourier transform and angular spectrum propagation spatial transform.

Step S32, performing phase quantization of the holographic phase image to obtain a quantized holographic image.

Step S321, if a vortex is present in the quantized holographic phase image, the vortex in the quantized holographic image is processed with a neighbor interpolation or is replaced by the preset value, to obtain a modified quantized holographic image.

Step S33, performing inverse holographic transformation of the modified quantized holographic image to obtain a reconstructed image corresponding to the target image;

Step S34, determining whether error of the reconstructed image is less than a preset precision threshold or whether the number of iterations with respect to the reconstructed image is equal to the preset total number threshold of iterations; if so, executing step S35, otherwise, executing step S36.

Step S35, determining the modified quantized holographic image as the target hologram.

Step S36, determining whether the number of iterations corresponding to the reconstructed image is greater than a preset threshold of the GS algorithm iterations; if the number of iterations corresponding to the reconstructed image is less than or equal to the preset threshold of the GS algorithm iterations, then executing step S37, otherwise executing S38.

Step S37, performing a first kind of amplitude constraint to the reconstructed image with the target amplitude according to the GS algorithm and returning to step S31, processing the reconstructed image after the first kind of amplitude constraint, which is seemed as a new round of target image and is iterative processed, and then updating the counting of the iteration number until the error of the processed reconstructed image satisfies the preset precision threshold or the current number of iterations equals the preset number threshold of the total iterations.

Step S38, if the number of iterations corresponding to the reconstructed image is greater than the preset number threshold of the GS algorithm iterations, further determining whether the error of the reconstructed image converges or not; if the error of the reconstructed image converges, executing step S39, otherwise executing step S311.

Step S39, performing a second kind of amplitude constraint to amplitude of the reconstructed image on the basis of weight factors corresponding to the preset target image and the reconstructed image as well as compensation factors, and accordingly accelerating convergence of the error of the reconstructed image. Wherein the second kind of amplitude constraint includes amplitude compensation constraints and energy conservation constraints.

Step S310, performing compensation constraint on the basis of the compensation factors, and returning to step S31, processing the reconstructed image after the second kind of amplitude constraint, which is seemed as a new round of target image and is iterative processed, and then updating the counting of the iteration number until the error of the processed reconstructed image satisfies the preset precision threshold or the current number of iterations equals the preset number threshold of the total iterations.

Step S311, performing a third kind of amplitude constraint or complex amplitude constraint to the reconstructed image to cause the amplitude or complex amplitude of the reconstructed image to get out of partial extremum.

Step S312, resetting the compensation factor to an initial value, returning step S31 and processing the reconstructed image after getting out of partial extremum, which is seemed as a new round of the target image and is iterative processed, and then updating the counting of the iteration number until the error of the processed reconstructed image satisfies the preset precision threshold or the current number of iterations equals the preset number threshold of the total iterations.

In a specific embodiment, it is preferably determined whether the error $Error_k$ of the reconstructed image satisfies a preset precision E or whether the iteration number k of the corresponding reconstructed image exceeds a total iteration number $N_{max}$ or not.

Wherein, $$Error_k = \frac{\iint (f(p) - \mu_k f'_k(p))^2 dp}{\iint f^2(p) dp}$$

$$\mu_k = \sqrt{\frac{\iint |f(p)|^2 dp}{\iint |f'_k(p)|^2 dp}}$$

Wherein, a function of $\mu_k$ is to ensure conservation of energy in the process of calculation.

If the error $Error_k$ of the reconstructed image is less than the precision E or is up to the total iteration number $N_{max}$, namely, $k \geq N_{max} \| Error_k \leq \varepsilon$, a final hologram is obtain, namely, $\psi_{final} = \psi'_k(r)$; and the cycle is over.

If it is not satisfied that the error $Error_k$ of the reconstructed image is less than the precision $\varepsilon$, or k is less than the total iteration number $N_{max}$, namely, $k \leq N_{max} \| Error_k \geq \varepsilon$, the cycle is continue, and determining whether k exceeds the iteration number $N_{GS}$ of GS algorithm, namely whether satisfying inequality: $k \leq N_{GS}$.

If k exceeds the iteration number $N_{GS}$ of GS algorithm, namely satisfying inequality: $k \geq N_{GS}$, it is to be determined whether the error converges, namely whether satisfying inequality: $Error_{k-1} - Error_{k-2} < 0$.

If k does not exceed the iteration number $N_{GS}$ of GS algorithm, namely satisfying inequality: $k \leq N_{GS}$, the first kind of amplitude constraint of the reconstructed image with the GS algorithm is performed to make the amplitude as the target amplitude, with unchanged phase, namely:

$$f_{k+1}(p) = C_1\{f'_k(p)\} = f(p)$$

$$\varphi_{k+1}(p) = \varphi'_k(p)$$

If k exceeds the iteration number $N_{GS}$ of GS algorithm and the error converges, namely satisfying: $k > N_{GS}$ && $Error_{k-1} - Error_{k-2} < 0$, the second kind of amplitude constraint of the amplitude of the reconstructed image signal window is performed to accelerate constraint of convergence and retain the amplitude of the noise window, with phase unchanged, namely:

$$f_{k+1}(p) = C_2\{f'_k(p)\} = \begin{cases} \mu_k[\alpha_k(\omega_1 f(p) - \omega_2 f'_k(p))] & p \in W_{signal} \\ \mu_k f'_k(p) & p \in W_{noise} \end{cases}$$

$$\varphi_{k+1}(p) = \varphi'_k(p)$$

Wherein, $\omega_1$ and $\omega_2$ represents weight factors of the target image and the reconstructed image respectively, and are used to control energy magnitude of the target image and the reconstructed image, separately.

The $\alpha_k$ represents the compensation factor for performing intensity compensation for the reconstructed image according to energy distribution of the reconstructed image with respect to the target image.

The $\mu_k$ is used to ensure conservation of energy in the process of calculation.

$W_{signal}$ and $W_{noise}$ are the signal window and the noise window, respectively.

$$W_{signal} = \begin{bmatrix} 0 & 0 & 0 & 0 & 0 & 0 & 0 & 0 & 0 \\ 0 & 0 & 0 & 0 & 0 & 0 & 0 & 0 & 0 \\ 0 & 0 & \vdots & \ldots & \ldots & \ldots & \vdots & 0 & 0 \\ 0 & 0 & \ldots & 1 & 1 & 1 & \ldots & 0 & 0 \\ 0 & 0 & \ldots & 1 & 1 & 1 & \ldots & 0 & 0 \\ 0 & 0 & \ldots & 1 & 1 & 1 & \ldots & 0 & 0 \\ 0 & 0 & \vdots & \ldots & \ldots & \ldots & \vdots & 0 & 0 \\ 0 & 0 & 0 & 0 & 0 & 0 & 0 & 0 & 0 \\ 0 & 0 & 0 & 0 & 0 & 0 & 0 & 0 & 0 \end{bmatrix}$$

$$W_{noisee} = \begin{bmatrix} 1 & 1 & 1 & 1 & 1 & 1 & 1 & 1 \\ 1 & 1 & 1 & 1 & 1 & 1 & 1 & 1 \\ 1 & 1 & \vdots & \ldots & \ldots & \ldots & \vdots & 1 & 1 \\ 1 & 1 & \ldots & 0 & 0 & 0 & \ldots & 1 & 1 \\ 1 & 1 & \ldots & 0 & 0 & 0 & \ldots & 1 & 1 \\ 1 & 1 & \ldots & 0 & 0 & 0 & \ldots & 1 & 1 \\ 1 & 1 & \vdots & \ldots & \ldots & \ldots & \vdots & 1 & 1 \\ 1 & 1 & 1 & 1 & 1 & 1 & 1 & 1 \\ 1 & 1 & 1 & 1 & 1 & 1 & 1 & 1 \end{bmatrix}$$

Then, the compensation factor $\alpha_k$ is adjusted to feedback constraints.

$$\alpha_{k+1} = \frac{f(p)}{f'_k(p)} \alpha_k$$

Wherein, $\alpha_k$ represents the compensation factor with an initial value of 1, and functions to feed back energy compensation according to energy distribution of the reconstructed image with respect to the target image.

If the iteration number $N_{GS}$ of GS algorithm is exceeded and the error is not convergent, namely satisfying: $k > N_{GS}$ && $Error_{k-1} - Error_{k-2} \geq 0$, the third kind of amplitude constraint or complex amplitude constraint are performed to reduce constraint of the reconstructed image, so that the iterations get out of partial extremum and return to convergence.

In the present embodiment, the third kind of amplitude constraint or complex amplitude constraint are preferably achieved by three methods as below:

Method 1: the amplitude of the reconstructed image signal window is constrained and is functioned as the target amplitude, and the amplitude of the noise window is retained, with phase unchanged, namely:

$$f_{k+1}(p) = C_3\{f'_k(p)\} = \begin{cases} \mu_k f(p) & p \in W_{signal} \\ \mu_k f'_k(p) & p \in W_{noise} \end{cases}$$

$$\varphi_{k+1}(p) = \varphi'_k(p)$$

Method 2: the amplitude of the reconstructed image signal window is constrained and is functioned as the target amplitude with relatively lower energy, and the amplitude of the noise window is retained, thus relatively increasing energy of the noise window, with phase unchanged, namely:

$$f_{k+1}(p) = C_3\{f'_k(p)\} = \begin{cases} \mu_k \gamma f(p) & p \in W_{signal} \\ \mu_k f'_k(p) & p \in W_{noise} \end{cases}$$

$$\varphi_{k+1}(p) = \varphi'_k(p)$$

The $\gamma$ is escape factor, wherein $\gamma < 1$, functions to decrease energy weight of the noise window and reduce constrain of the target, so that the iterations regress convergence.

Method 3: performing amplitude constraint to the reconstructed image similar to the second kind of amplitude constraint, and then superposing a random perturbation to the phase, so that the iterations get out of partial extremum.

$$f_{k+1}(p) = C_3\{f'_k(p)\} = \begin{cases} \mu_k [\alpha_k(\omega_1 f(p) - \omega_2 f'_k(p))] & p \in W_{signal} \\ \mu_k f'_k(p) & p \in W_{noise} \end{cases}$$

$$\varphi_{k+1}(p) = \varphi'_k(p) + \Delta\varphi$$

After the iterations get out of partial extremum, the compensation factor is adjusted and reset to 1.

$$\alpha_{k+1} = 1$$

In accordance with the embodiments of the present invention, the method for generating the holographic image, the processor, the holographic image display device and the apparatus preferably perform a series of following processes: setting initial parameters, generating a hologram by diffraction transmission; iteratively quantizing phase of the hologram; performing inverse diffraction transmission to obtain the reconstructed image; determining whether accuracy or total iteration number are satisfied or not, determining whether GS iteration number is exceeded, determining whether the error is convergent or not if the GS iteration number is exceeded, constraining amplitude within the number of the GS iteration number, constraining the compensation factors and constraining the amplitude if the GS iteration number is exceeded and the error is convergent, constraining the compensation factors and constraining the amplitude got out of partial extremum or the complex amplitude if the GS iteration number is exceeded and the error is not convergent, etc. As a result, acceleration of iteration convergence and getting out of partial minimum are effectively achieved, accordingly realizing generation of high contrast and low noise real-time fast dynamic hologram. Moreover, free adjustment of imaging distance can be realized.

The method embodiments are described as a series of operation combinations for the sake of simplified description. However, in accordance with these embodiments of the present invention, since some steps may be performed in other order or simultaneously, it should be known to those skilled in the art that these embodiments of the present invention are not limited by the order of operations above described. Secondly, it should also be understood to those skilled in the art that theses embodiments in the present description are preferred embodiments, and that some operations involved are not necessarily necessary for the embodiments of the present invention.

Figure 4:
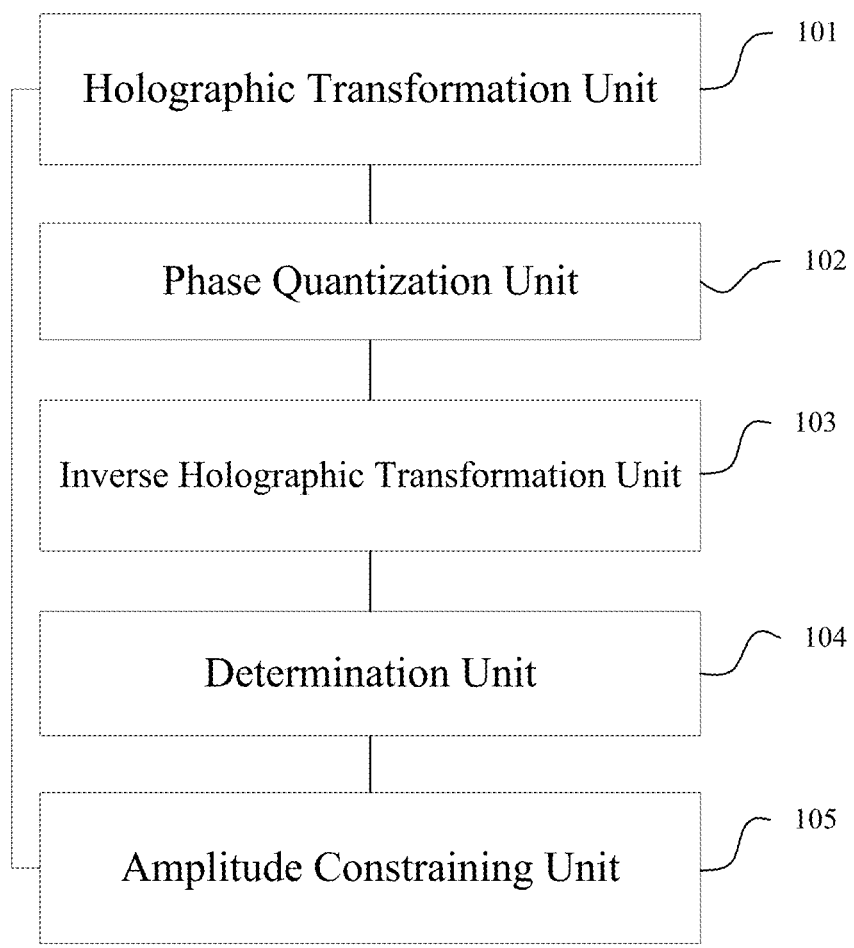
FIG. 4 is a structural schematic view of a signal processor in accordance with one embodiment of the present invention.

FIG. 4 schematically illustrates structure of a signal processor 10 according to one embodiment of the present invention. Referring to FIG. 4, in accordance with the embodiment of the present invention, the signal processor includes a holographic transformation unit 101, a phase quantization unit 102, an inverse holographic transformation unit 103, a determination unit 104 and a complex amplitude constraining unit 105.

The holographic transformation unit 101 is configured for performing holographic transformation of the target amplitude phase distribution of the target image to obtain a holographic phase image corresponding to the target image;

The phase quantization unit 102 is configured for performing phase quantization of the holographic phase image to obtain a quantized holographic image;

The inverse holographic transformation unit 103 is configured for performing inverse holographic transformation of the quantized holographic image to obtain a reconstructed image corresponding to the target image;

The determination unit 104 is configured for determining whether the reconstructed image satisfies a preset condition or not, if the reconstructed image satisfies the preset condition, then determining that the quantized holographic image is the target holographic image.

The complex amplitude constraining unit 105 is configured for constraining the amplitude phase of the reconstructed image corresponding to the target image if the reconstructed image does not satisfy the preset condition, and returning to the holographic transformation unit for continuing iteration with the holographic transformation unit on the basis of the image with amplitude phase constrained.

Figure 5:
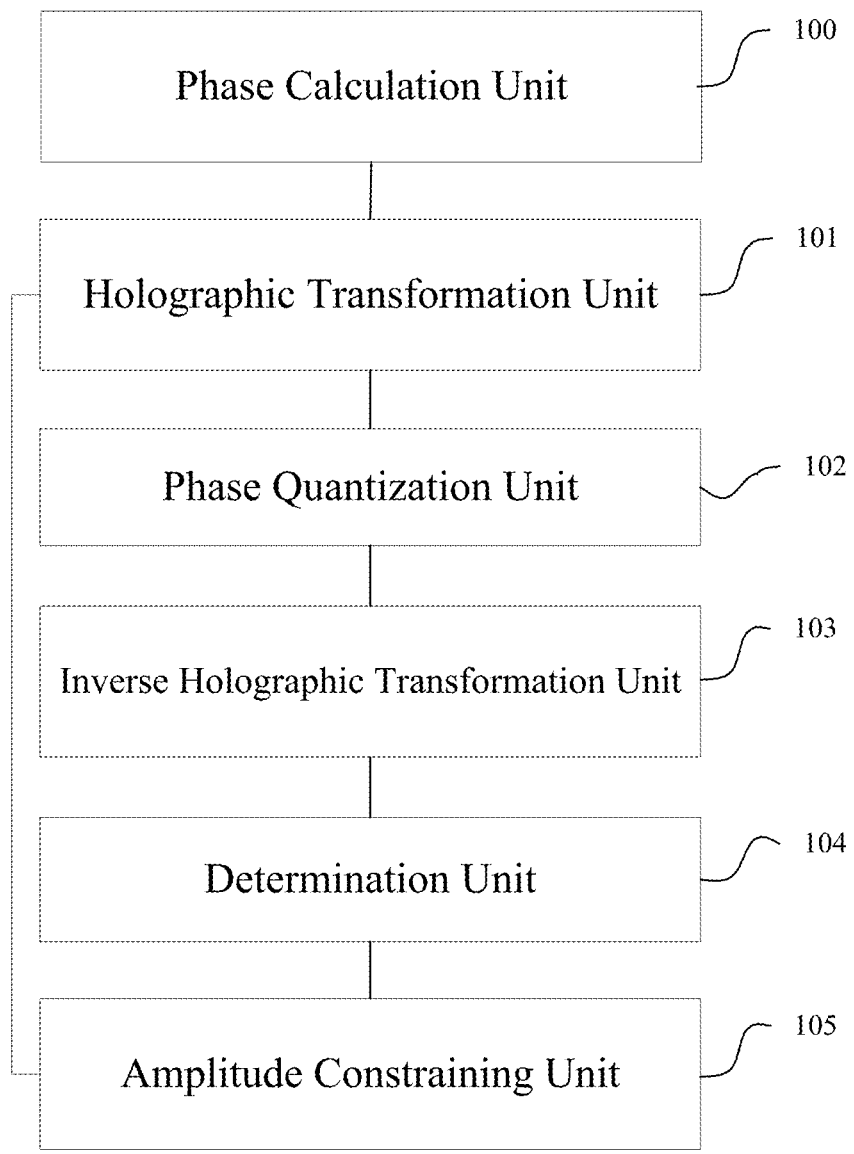
FIG. 5 is a structural schematic view of a signal processor in accordance with another embodiment of the present invention.

In another embodiment of the present invention, as shown in FIG. 5, the signal processor further includes a phase calculation unit 100, which is configured to acquire the target image and calculate the phase distribution of the target image before performing the holographic transformation of the target amplitude phase distribution on the basis of the target image, thereby obtaining the target amplitude phase distribution of the target image.

Perferably, the signal processor further includes a pixel adjustment unit not shown in the drawings, which is configured to adjust sizes of the corresponding color pixels in the target image according to wavelength of various color lasers before performing the holographic transformation of the target amplitude phase distribution on the basis of the target image.

Furthermore, the phase quantization unit 102 is further configured for determining quantization order and quantization range of various color lasers according to wavelength of various color lasers before performing phase quantization of the holographic phase image.

Figure 6:
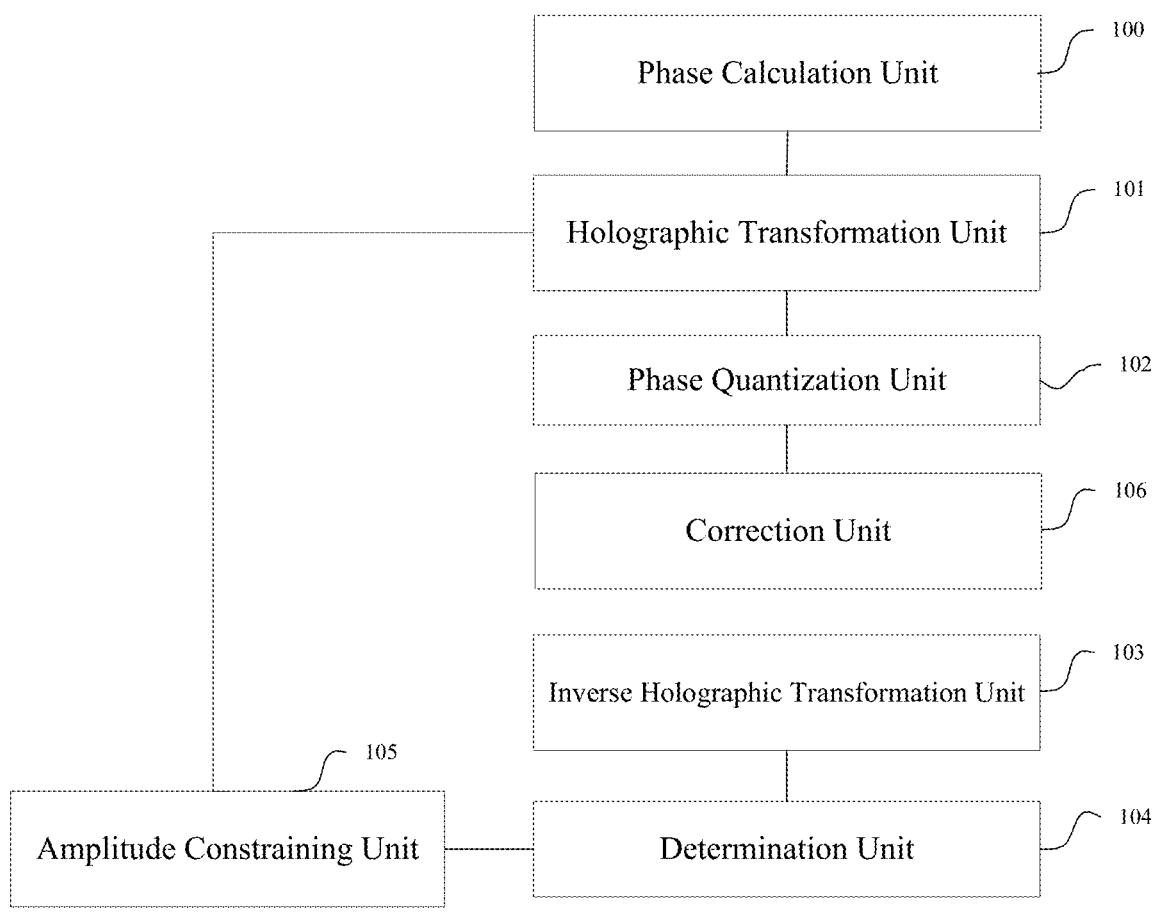
FIG. 6 is a structural schematic view of a signal processor in accordance with still another embodiment of the present invention.

In the present embodiment, as shown in FIG. 6, the signal processor further includes a correction unit 106, which is configured to perform a neighbor interpolation or replacing with a preset value for vortices of the quantized holographic image which are presented in the holographic phase image with phase quantized after phase quantization of the holographic phase image, to obtain corrected quantized holographic image.

In another alternative embodiment, the determination unit 104 is specifically configured for determining whether the error of the reconstructed image satisfies a preset precision threshold or not, whether the number of iterations corresponding to the reconstructed image is up to the preset number threshold of the total iterations or not. If the error of the reconstructed image is less than the preset precision threshold or the number of iterations corresponding to the reconstructed image equals the preset number threshold of the total iterations, it is to be determined that the reconstructed image satisfies the preset condition.

Correspondingly, the determination unit 104 is specifically configured for determining the iteration number corresponding to the reconstructed image is greater than the number threshold of the preset GS algorithm iterations or not, if the error of the reconstructed image is greater than or equal to the preset precision threshold and the number of iterations corresponding to the reconstructed image is less than threshold of the preset total number of iterations.

The complex amplitude constraining unit 105 is specifically configured for performing the first kind of amplitude constraint to the reconstructed image with the target amplitude according to the GS algorithm if the iteration number corresponding to the reconstructed image is less than or equal to the preset number threshold of the GS algorithm iterations.

The holographic transformation unit 101 is further configured for processing the reconstructed image after the first kind of amplitude constraint, which is seemed as a new round of the target image and is iterative processed, and then updating the counting of the iteration number until the error of the processed reconstructed image satisfies the preset precision threshold or the current number of iterations equals the preset number threshold of the total iterations.

In the present embodiment, the determination unit 104 is further configured for determining whether the error of the reconstructed image converges or not if the number of iterations corresponding to the reconstructed image is greater than the preset number threshold of the GS algorithm iterations.

The complex amplitude constraining unit 105 is further configured for performing a second kind of amplitude constraint to the amplitude of the reconstructed image on the basis of the weight factors corresponding to the preset target image and the reconstructed image as well as the compensation factors if the error of the reconstructed image converges, and accordingly accelerating convergence of the error of the reconstructed image.

The holographic transformation unit 101 is further configured for processing the reconstructed image after the second kind of amplitude constraint, which is seemed as a new round of the target image and is iterative processed, and then updating the counting of the iteration number until the error of the processed reconstructed image satisfies the preset precision threshold or the current number of iterations equals the preset number threshold of the total iterations.

The complex amplitude constraining unit 105 is further configured for performing the third kind of amplitude constraint or complex amplitude constraint to the reconstructed image if the error of the reconstructed image does not converge, so that the amplitude or complex amplitude of the reconstructed image get out of partial extremum, and resetting the compensation factor to an initial value.

The holographic transformation unit 101 is further configured for processing the reconstructed image after getting out of partial extremum, which is seemed as a new round of the target image and is iterative processed, and then updating the counting of the iteration number until the error of the processed reconstructed image satisfies the preset precision threshold or the current number of iterations equals the preset number threshold of the total iterations.

For the exemplary embodiments relative to devices, since the devices is essentially similar to the method embodiments, description of device is simplified and corresponding features of devices may be referred to description of the method embodiments.

Figure 7:
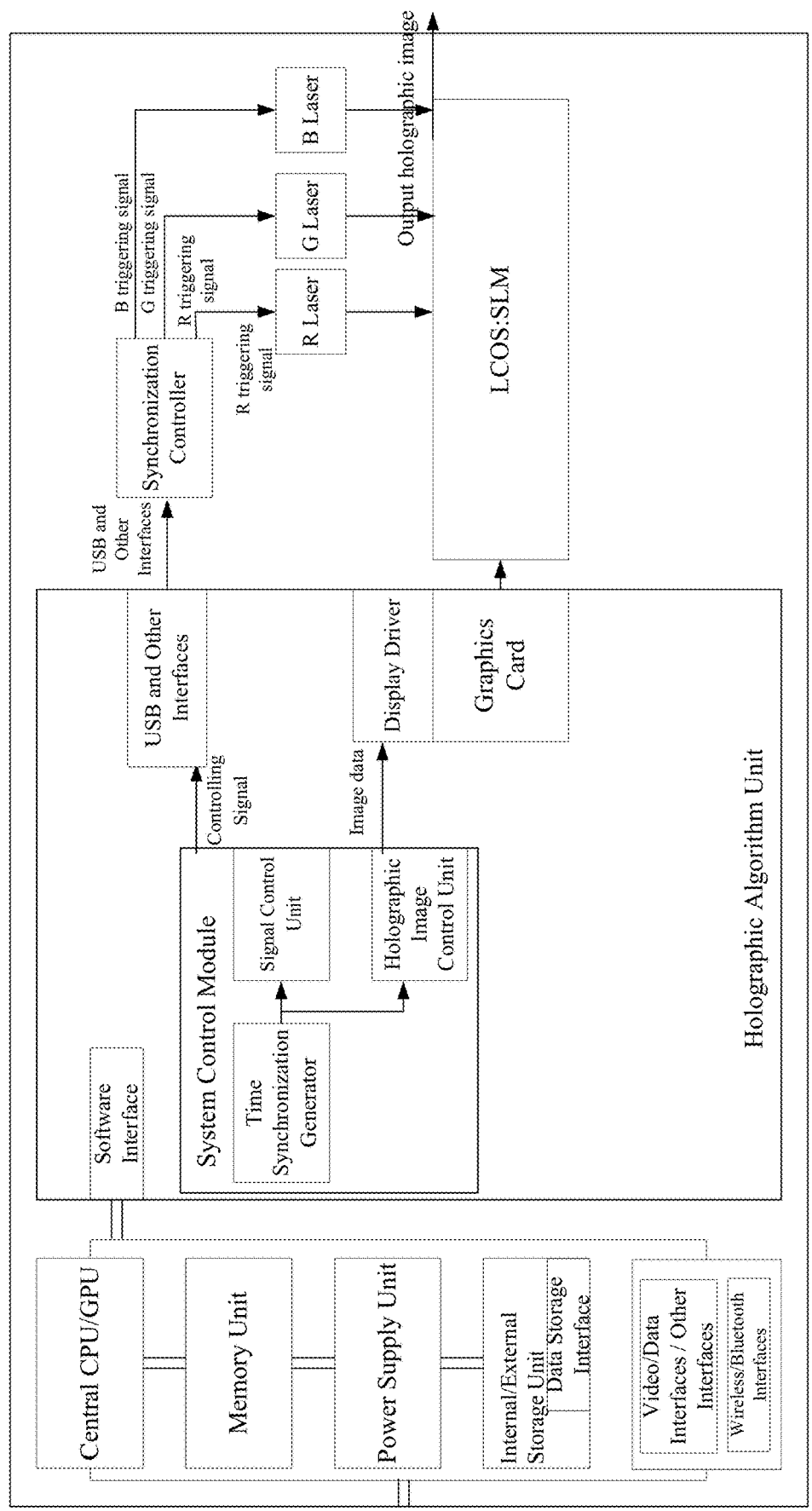
FIG. 7 is a structural diagram of a specific chip structure of the signal processor in the embodiment of the present invention.

FIG. 7 provides a schematic diagram of a specific chip structure of the signal processor 10 in the embodiment of the present invention. The working principle of the holographic chip processor of the present invention is that data instructions are transmitted to software interface of the holographic algorithm unit mainly through a main operation unit of a central CPU and GPU, so as to trigger system control module to call its time synchronization generator for controlling signal and holographic algorithm. One path is to control laser in a light source device via data interface and the other path is to control the spatial light modulator SLM, and then output of the two paths is combined to present the desired holographic image.

Figure 8:
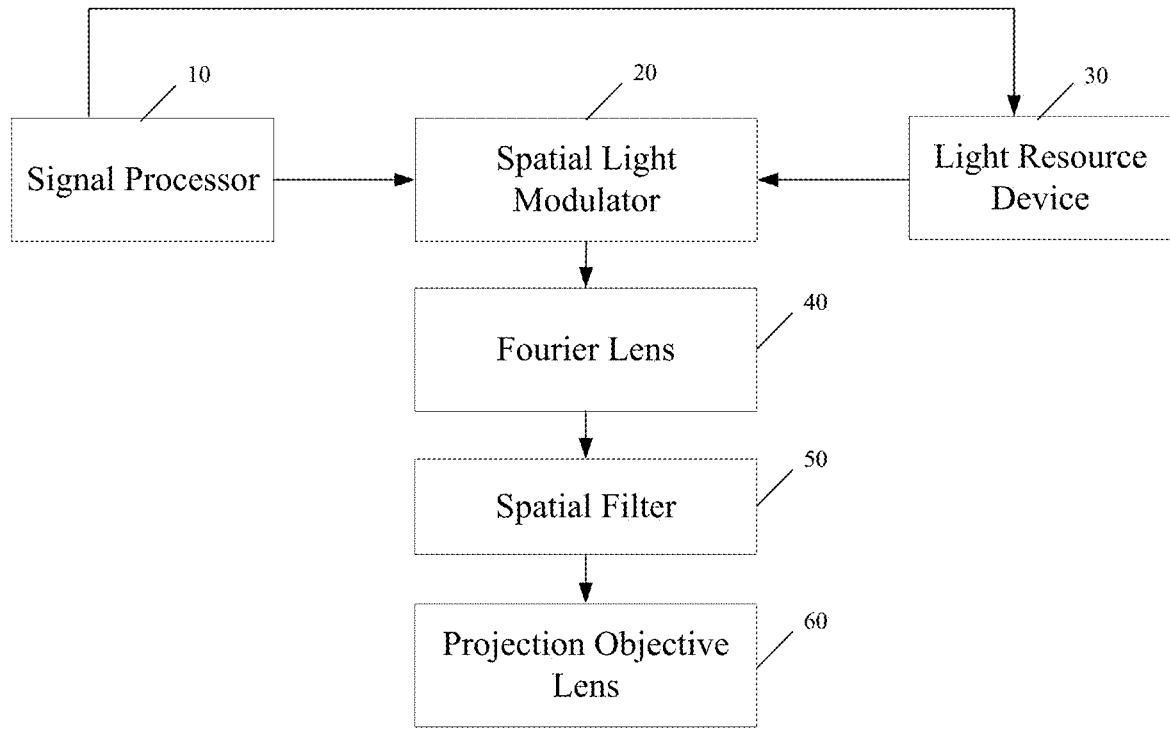
FIG. 8 is a structural schematic view of a holographic image display device in accordance with one embodiment of the present invention.

In accordance with another embodiment of the present invention, a holographic image display device is provided. As shown in FIG. 8, the holographic image display device includes the signal processor 10 described in any of the above embodiments, a spatial light modulator SLM 20, a light resource device 30, a Fourier lens 40, a spatial filter 50, and a projection objective lens 60. The spatial light modulator SLM 20 is configured to utilize the target holographic image obtained by the signal processor 10 as a source of image, and apply the target holographic image into incident beam of the light source device 30. The holographic reconstructed image is obtained by performing transmission diffraction transformation and selecting the +1 (or −1) level with the Fourier lens 40 and the spatial filter 50, and then is enlarged by the projection objective lens 60, accordingly forming an enlarged corresponding image.

Figure 9:
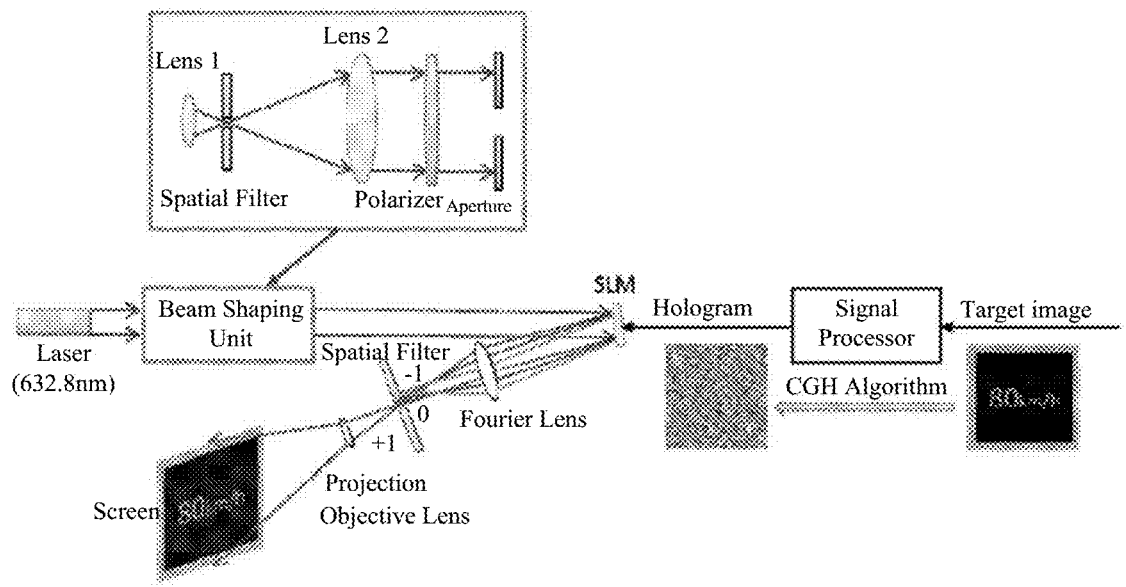
FIG. 9 is a schematic diagram of a monochrome holographic image display device in accordance with one embodiment of the present invention.

In accordance with an alternative embodiment of the present invention, the light resource device includes monochrome lasers and a corresponding beam shaping unit. The monochrome light emitted from the monochrome lasers is collimated through the beam shaping unit and then incident to the spatial light modulator. In which, the beam shaping unit specifically includes a first lens, a spatial filter, a second lens, a polarizer and an aperture arranged in turn. Among them, the aperture is an optical element having a restriction to beam passing through the optical system. The aperture might be a frame of one optical element (such as a lens, a reflector, etc.) or a separated opaque screen with a circular hole. The present embodiment preferably gives realization principle of the light source device with respect to display of monochrome holographic pictures. Referring to FIG. 9, FIG. 9 is a schematic diagram of a monochrome holographic image display.

Figure 10:
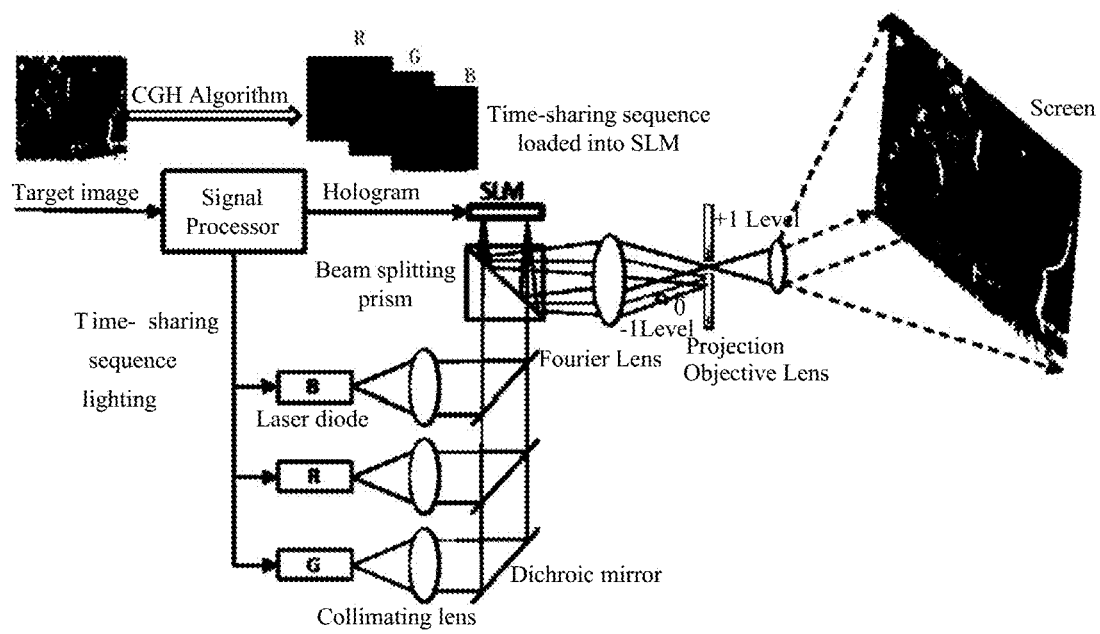
FIG. 10 is a schematic diagram of a multi-colour holographic image display device in accordance with one embodiment of the present invention.

In accordance with an alternative embodiment of the present invention, the light source device includes a red laser emitter, a green laser emitter, a blue laser emitter and a corresponding beam shaping unit. The light source device controls the laser emitters with the corresponding colors to emit in corresponding time-sharing sequence according to the time-sharing sequence in which the target hologram image with various colors is loaded by the signal processor. The corresponding color beams are collimated by the beam shaping unit corresponding to the laser emitters with the corresponding colors, and then are incident to the spatial light modulator. In the present embodiment, the beam shaping unit corresponding to each color laser emitter includes a collimating lens. In order to enable the spatial light modulator SLM 20 to apply the target holographic image obtained by the signal processor 10 as diffraction information to the incident beams of the light source device 30, the light source device further includes a dichroic mirror corresponding to the laser emitters of various colors and a beam splitting prism. The dichroic mirror is configured for rendering the laser emitter with the corresponding colors to be incident towards the SLM. The beam splitting prism is configured to cause light beams containing information of the target holographic image to be incident towards the above Fourier lens 40. The present embodiment preferably gives realization principle of the light source device with respect to display of multi-color holographic pictures. Referring to FIG. 10, FIG. 10 is a schematic diagram of a multi-color holographic image display.

In accordance with another embodiment of the present invention, a holographic image display device is provided, which includes the signal processor described in any of the above embodiments, a light resource device, a spatial light modulator SLM loaded with digital spherical phase modulation, the spatial filter, and the projection objective lens. The spatial light modulator SLM loaded with digital spherical phase modulation is configured to utilize the target holographic image obtained by the signal processor as a source of image, apply the target holographic image into incident beam of the light source device and perform transmission diffraction transformation. The holographic reconstructed image is obtain by selecting process with the spatial filter, and is enlarged by the projection objective lens, accordingly forming an enlarged corresponding image. In accordance with the embodiment of the present invention, the Fourier lens 40 is replaced with the spatial light modulator SLM loaded with digital spherical phase modulation, thereby simplifying the whole structure of the device.

The above-mentioned descriptions are merely the exemplary embodiment of the device, in which any components described as a separated part may or may not be physically separated, and any parts shown as a component may or may not be physical units, namely located in one position or distributed to multiple network units. Some or all of the units can be selected according to actual demands to achieve purpose of the present disclosure. One skilled in the art is able to understand and implement the present invention without any creative work.

Figure 11:
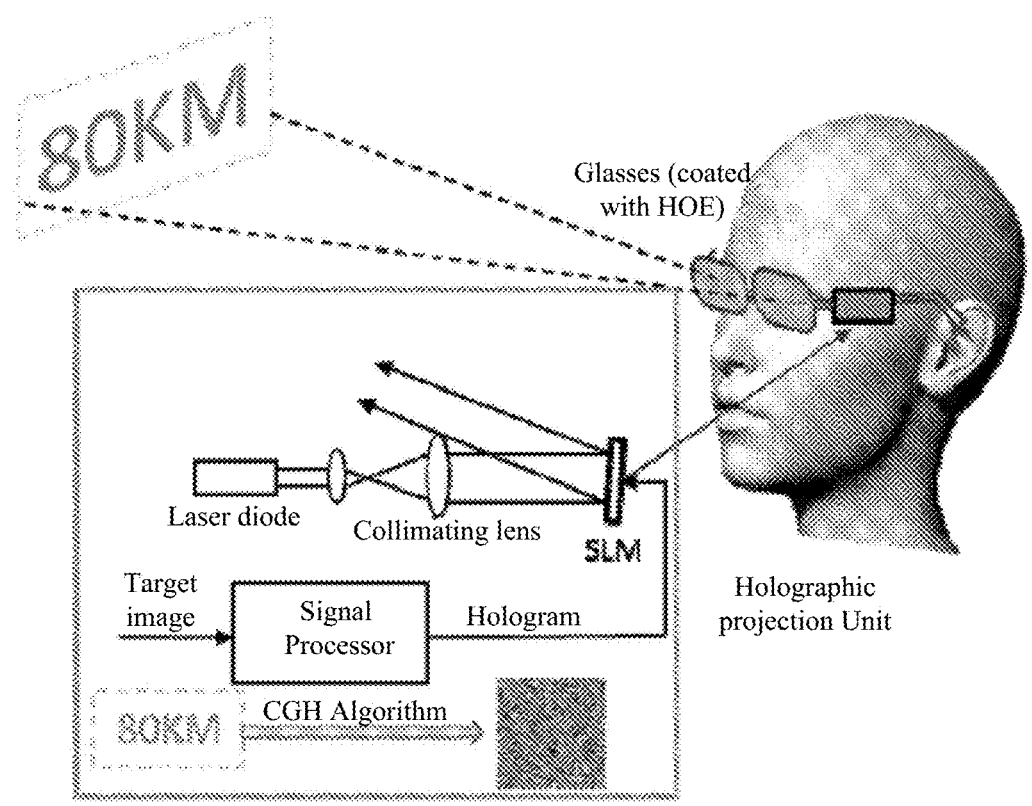
FIG. 11 illustrates imaging principle of a wearable apparatus in accordance with one embodiment of the present invention.

Furthermore, in accordance with still another embodiment of the present invention, a wearable apparatus is provided, which includes a wearable device, a display screen disposed on the wearable device and the holographic image display device described in any of the above embodiments. The display screen is coated with a reflection film or a holographic optical element film to form a virtual enlarged image of the projected display image generated by the holographic image display device. FIG. 11 illustrates an imaging principle of the wearable apparatus. A smart glasses is taken as an example for illustrating technical solution of the present invention. A display screen of the smart glasses is preferably used as a lens of the glasses, and a reflection film or a holographic optical element film is coated on the lens. It should be understood that, besides the smart glasses, the wearable apparatus of the present embodiment can also include other wearable smart devices such as a smart helmet.

Figure 12:
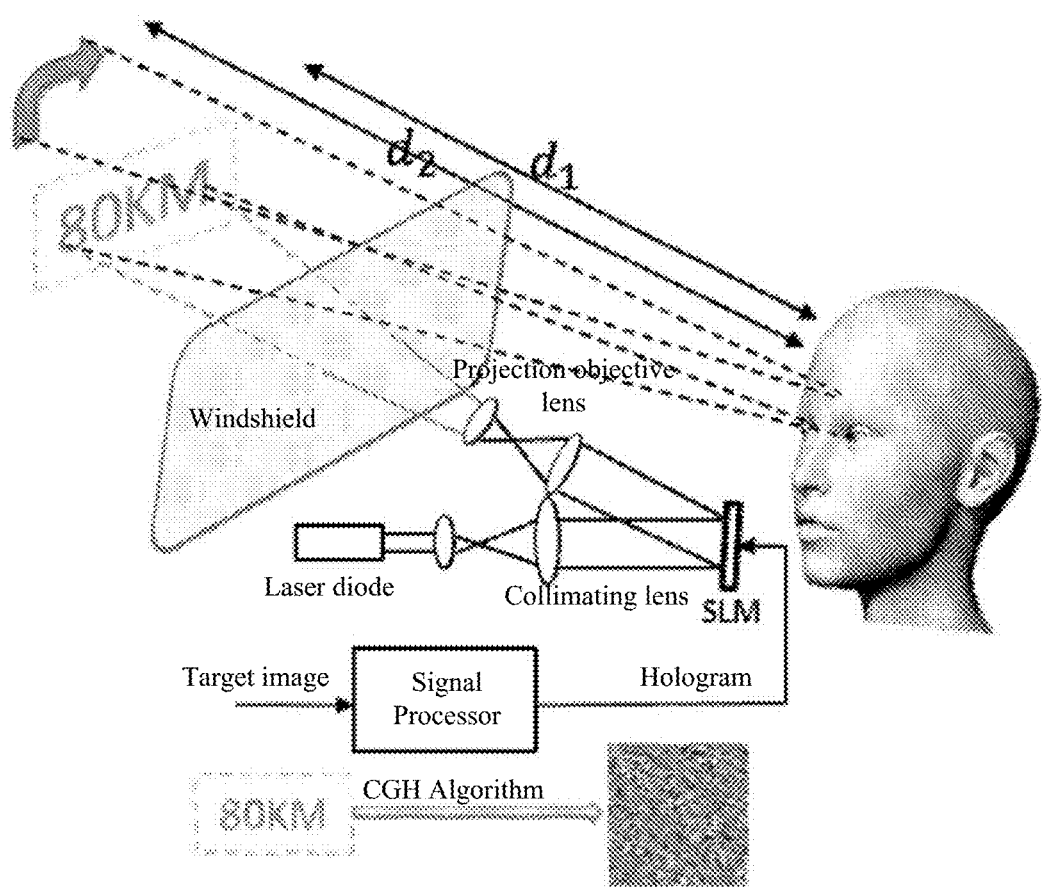
FIG. 12 illustrates imaging principle of an onboard head-up display device.

Moreover, in accordance with an embodiment of the present invention, an onboard head-up display apparatus is provided, which includes a display screen and the holographic image display device described in any of the above embodiments. The display screen is coated with a reflection film or a holographic optical element film to form a virtual enlarged image of the projected display image generated by the holographic image display device. FIG. 12 illustrates an imaging principle of the onboard head-up display apparatus. A display screen of the onboard head-up display apparatus is usefully a windshield which is coated with the reflective film or the holographic optical element film.

The holographic optical element film is hereinafter referred to as HOE, and is a film made of HOE.

In the present embodiments of the present invention, the method for generating a holographic image is applied to the wearable apparatus and the onboard head-up display apparatus, which has high energy efficiency and can realize free position imaging. Taken a laser scanning HUD of the MEMS as a comparison, it causes a lot of energy loss while image area displayed is only occupied by 10% due to a laser scanning operation principle of the MEMS that the laser is irradiated entirely on the MEMS. Further, since the MEMS is in a high-speed rotating state, the laser will be directed into eyes of people once a problem happens, accordingly causing human damage. Generally, imaging position should be unchanged, or may be adjusted by a additional optical system, resulting in larger volume and higher cost of the system. However, a system based on liquid crystal phase spatial light modulator is capable t utilizing the algorithm to modulate the imaging position freely and compensate aberration of the system. Real-time adjustable imaging distance is achieved through a processing of the holographic conversion algorithm, and thus a focal length of the image can be in a far distance.

By determining whether the reconstructed image satisfies the preset conditions, the method for generating a holographic image, the processor, the holographic image display device and the apparatus, in accordance with the embodiments of the present invention, can rapidly and efficiently achieve processing and display of real-time holographic image with high contrast and low noise, and can realize free adjustment of imaging distance.

According to the above description of the present embodiments, it is clearly known to those skilled in the art that the various embodiments are able to be implemented by means of software plus necessary general hardware platform, or apparently implemented by means of hardware. As such, it should be understood that the above technical solution should be embodied in a form of software products in nature or in part which is contributive with respect to the traditional art. The software products can be stored in computer readable storage media, such as ROM/RAM, disk, CD-ROM, etc., and include a plurality of instructions for executing the methods described in various embodiments or the method in part of the present embodiments by a computer apparatus (such as a personal computer, a server, or a network device, etc.) that performs in some parts of the embodiments.

Furthermore, it should be understood to one skilled in the art that, although some above embodiments are described to include certain features within other embodiments but not other features, combination of the features from various embodiments is in the scope of the present disclosure and forms another different embodiment. For example, any of the above embodiments to be protected are able to be combined by any means, as claimed in claims of present disclosure.

In final, it is to be noted that the above-mentioned descriptions represent merely the exemplary embodiments of the present disclosure, without any intention to limit the scope of the present disclosure thereto. Although the present invention is described in detail with reference to the above embodiments, those skilled in the art should understand that they can still modify the technical solution recited in the aforementioned embodiments or do various equivalent changes to some features. These modifications or substitutions of the corresponding technical features will not depart from the spirit and scope of the technical disclosure of every embodiment of the present invention.

What is claimed is:

1. A method for generating a holographic image comprises:
   performing holographic transformation on the basis of a target amplitude phase distribution of a target image to obtain a holographic phase image corresponding to the target image;
   performing phase quantization of the holographic phase image to obtain a quantized holographic image;
   performing inverse holographic transformation of the quantized holographic image to obtain a reconstructed image corresponding to the target image;
   if the reconstructed image satisfies a preset condition, then determining that the quantized holographic image is a target holographic image;
   if not, constraining the amplitude phase of the reconstructed image corresponding to the target image and, on the basis of the amplitude phase constrained image, continuing iteration;
   the method further comprises at least one of the two following steps:
   1) determining whether error of the reconstructed image satisfies a preset precision threshold or whether the number of iterations with respect to the reconstructed image is up to a preset total number threshold of iterations; if the error of the reconstructed image is less than the preset precision threshold or the number of iterations corresponding to the reconstructed image equals the preset number threshold of the total iterations, and determining that the reconstructed image satisfies the preset condition;
   2) determining whether error of the reconstructed image satisfies a preset precision threshold or whether the number of iterations with respect to the reconstructed image is up to a preset total number threshold of iterations; if the error of the reconstructed image is greater than or equal to the preset precision threshold and the number of iterations corresponding to the reconstructed image is less than the preset number threshold of the total iterations, performing the operation of constraining the amplitude phase of the reconstructed image corresponding to the target image.

2. The method according to claim 1, wherein the holographic transformation is selected from the group consisting of Fourier transform, Fresnel transform, fast Fourier transform, fractional Fourier transform and angular spectrum propagation spatial transform.

3. The method according to claim 2, wherein the method further comprises at least one of the two following steps:
   adjusting sizes of the corresponding color pixels in the target image according to wavelength of various color lasers before calculating phase distribution of the target image;
   determining quantization order and quantization range of various color lasers according to the wavelength of various color lasers before performing phase quantization of the holographic phase image.

4. The method according to claim 1, wherein the method further comprises the following step after performing the phase quantization of the holographic phase image:
   if a vortex is presented in the phase quantized holographic phase image, the vortex of the quantized holographic image is processed with a neighbor interpolation or replaced by a preset value, to obtain a modified quantized holographic image.

5. The method according to claim 1, wherein the operation of constraining the amplitude phases of the reconstructed image corresponding to the target image comprises one or any combination of the following steps:
   i) determining whether the number of iterations corresponding to the reconstructed image is greater than a preset threshold of the GS algorithm iterations; performing a first kind of amplitude constraint to the reconstructed image with the target amplitude according to the GS algorithm if the number of iterations corresponding to the reconstructed image is less than or equal to the preset threshold of the GS algorithm iterations; and processing the reconstructed image after the first kind of amplitude constraint, which is seemed as a new round of the target image and is iterative processed, and then updating the counting of the iteration number until the error of the processed reconstructed image satisfies the preset precision threshold or the current number of iterations equals the preset number threshold of the total iterations;

ii) determining whether the error of the reconstructed image converges or not if the number of iterations corresponding to the reconstructed image is greater than the preset number threshold of the GS algorithm iterations, performing a second kind of amplitude constraint to amplitude of the reconstructed image on the basis of weight factors corresponding to the preset target image and the reconstructed image as well as compensation factors if the error of the reconstructed image converges, accordingly accelerating convergence of the error of the reconstructed image; performing compensation constraint on the basis of the compensation factors, processing the reconstructed image after the second kind of amplitude constraint, which is seemed as a new round of target image and is iterative processed, and updating the counting of the iteration number until the error of the processed reconstructed image satisfies the preset precision threshold or the current number of iterations equals the preset number threshold of the total iterations;

iii) determining whether the error of the reconstructed image converges or not if the number of iterations corresponding to the reconstructed image is greater than the preset number threshold of the GS algorithm iterations, performing a third kind of amplitude constraint or complex amplitude constraint to the reconstructed image to cause the amplitude or complex amplitude of the reconstructed image to get out of partial extremum if the error of the reconstructed image does not converge, resetting the compensation factor to an initial value, processing the reconstructed image after getting out of partial extremum, which is seemed as a new round of the target image and is iterative processed, and updating the counting of the iteration number until the error of the processed reconstructed image satisfies the preset precision threshold or the current number of iterations equals the preset number threshold of the total iterations.

6. A signal processor comprises:
a holographic transformation unit configured for performing holographic transformation of a target amplitude phase distribution of a target image to obtain a holographic phase image corresponding to the target image;
a phase quantization unit configured for performing phase quantization of the holographic phase image to obtain a quantized holographic image;
an inverse holographic transformation unit configured for performing inverse holographic transformation of the quantized holographic image to obtain a reconstructed image corresponding to the target image;
a determination unit configured for determining whether the reconstructed image satisfies a preset condition or not, if the reconstructed image satisfies the preset condition, then determining that the quantized holographic image is a target holographic image;
a complex amplitude constraining unit configured for constraining the amplitude phase of the reconstructed image corresponding to the target image if the reconstructed image does not satisfy the preset condition, and returning to the holographic transformation unit for continuing iteration with the holographic transformation unit on the basis of the amplitude phase constrained image; and
a correction unit being configured to perform a neighbor interpolation or replacing with a preset value for vortices of the quantized holographic image which are presented in the holographic phase image with phase quantized after the phase quantization of the holographic phase image.

7. The signal processor according to claim 6, wherein the signal processor further comprises a pixel adjustment unit, the pixel adjustment unit being configured for adjusting sizes of the corresponding color pixels in the target image according to wavelength of various color lasers before calculating phase distribution of the target image.

8. The signal processor according to claim 7, wherein the phase quantization unit is further configured for determining quantization order and quantization range of various color lasers according to the wavelength of various color lasers before performing phase quantization of the holographic phase image.

9. The signal processor according to claim 8, wherein the determination unit is further configured for determining whether error of the reconstructed image satisfies a preset precision threshold or not, or determining whether the number of iterations corresponding to the reconstructed image is up to the preset number threshold of the total iterations or not, if the error of the reconstructed image is less than the preset precision threshold or the number of iterations corresponding to the reconstructed image equals the preset number threshold of the total iterations, it is to be determined that the reconstructed image satisfies the preset condition.

10. The signal processor according to claim 9, wherein the determination unit is further configured for determining whether the number of iterations corresponding to the reconstructed image is greater than a preset threshold of the GS algorithm iterations if the error of the reconstructed image is greater than or equal to the preset precision threshold and the number of iterations corresponding to the reconstructed image is less than the preset number threshold of the total iterations;
the complex amplitude constraining unit is further configured for performing a first kind of amplitude constraint to the reconstructed image with the target amplitude according to the GS algorithm if the number of iterations corresponding to the reconstructed image is less than or equal to the preset threshold of the GS algorithm iterations;
the holographic transformation unit is further configured for processing the reconstructed image after the first kind of amplitude constraint, which is seemed as a new round of target image and is iterative processed, and updating the counting of the iteration number until the error of the processed reconstructed image satisfies the preset precision threshold or the current number of iterations is up to the preset number threshold of the total iterations.

11. The signal processor according to claim 10, wherein the determination unit is further configured for determining whether the error of the reconstructed image converges or not if the number of iterations corresponding to the reconstructed image is greater than the preset number threshold of the GS algorithm iterations;
the complex amplitude constraining unit is further configured for performing a second kind of amplitude constraint to amplitude of the reconstructed image on the basis of weight factors corresponding to the preset target image and the reconstructed image as well as compensation factors, and accordingly accelerating convergence of the error of the reconstructed image, if the error of the reconstructed image converges;

the holographic transformation unit is further configured for processing the reconstructed image after the second kind of amplitude constraint, which is seemed as a new round of target image and is iterative processed, and updating the counting of the iteration number until the error of the processed reconstructed image satisfies the preset precision threshold or the current number of iterations is up to the preset number threshold of the total iterations.

12. The signal processor according to claim 11, wherein the complex amplitude constraining unit is further configured for performing a third kind of amplitude constraint or complex amplitude constraint to the reconstructed image if the error of the reconstructed image does not converge, so that the amplitude or complex amplitude of the reconstructed image get out of partial extremum, and resetting the compensation factor to an initial value;

the holographic transformation unit is further configured for processing the reconstructed image after getting out of the partial extremum, which is seemed as a new round of the target image and is iterative processed, and updating the counting of the iteration number until the error of the processed reconstructed image satisfies the preset precision threshold or the current number of iterations equals the preset number threshold of the total iterations.

13. A holographic image display device, comprises the signal processor according to claim 10, a light resource device, a spatial light modulating module, a spatial filter, and a projection objective lens, the spatial light modulating module is a spatial light modulator SLM loaded with digital spherical phase modulation or a combination of a spatial light modulator SLM and a Fourier lens, the spatial light modulating module being configured to utilize the target holographic image obtained by the signal processor as a source of image, apply the target holographic image into incident beam of the light source device, and perform transmission diffraction transformation and selection operation cooperating with the spatial filter, thereby obtaining the holographic reconstructed image which is enlarged by the projection objective lens, accordingly forming an enlarged corresponding image.

14. The holographic image display device according to claim 13, wherein the light resource device is one of a monochrome light resource system and a multi-color light resource system, the monochrome light resource system comprising monochrome lasers and a corresponding beam shaping unit, the monochrome light emitted from the monochrome lasers being collimated through the beam shaping unit and then incident to the spatial light modulator; the multi-color light resource system comprising a red laser emitter, a green laser emitter, a blue laser emitter and a corresponding beam shaping unit, in the multi-color light resource system, the light source device being further configured for controlling the laser emitters with the corresponding colors to emit in corresponding time-sharing sequence according to the time-sharing sequence in which the target hologram image with various colors is loaded by the signal processor, the corresponding color beams being collimated by the beam shaping unit corresponding to the laser emitters with the corresponding colors, and then being incident to the spatial light modulator.

15. The holographic image display device according to claim 13, wherein the phase quantization unit is further configured for determining quantization order and quantization range of various color lasers according to the wavelength of various color lasers before performing phase quantization of the holographic phase image.

16. The holographic image display device according to claim 13, wherein the determination unit is further configured for determining whether error of the reconstructed image satisfies a preset precision threshold or not, or determining whether the number of iterations corresponding to the reconstructed image is up to the preset number threshold of the total iterations or not, if the error of the reconstructed image is less than the preset precision threshold or the number of iterations corresponding to the reconstructed image equals the preset number threshold of the total iterations, it is to be determined that the reconstructed image satisfies the preset condition.

17. The holographic image display device according to claim 16, wherein the determination unit is further configured for determining whether the number of iterations corresponding to the reconstructed image is greater than a preset threshold of the GS algorithm iterations if the error of the reconstructed image is greater than or equal to the preset precision threshold and the number of iterations corresponding to the reconstructed image is less than the preset number threshold of the total iterations;

the complex amplitude constraining unit is further configured for performing a first kind of amplitude constraint to the reconstructed image with the target amplitude according to the GS algorithm if the number of iterations corresponding to the reconstructed image is less than or equal to the preset threshold of the GS algorithm iterations;

the holographic transformation unit is further configured for processing the reconstructed image after the first kind of amplitude constraint, which is seemed as a new round of target image and is iterative processed, and updating the counting of the iteration number until the error of the processed reconstructed image satisfies the preset precision threshold or the current number of iterations is up to the preset number threshold of the total iterations.

18. The holographic image display device according to claim 17, wherein the determination unit is further configured for determining whether the error of the reconstructed image converges or not if the number of iterations corresponding to the reconstructed image is greater than the preset number threshold of the GS algorithm iterations;

the complex amplitude constraining unit is further configured for performing a second kind of amplitude constraint to amplitude of the reconstructed image on the basis of weight factors corresponding to the preset target image and the reconstructed image as well as compensation factors, and accordingly accelerating convergence of the error of the reconstructed image, if the error of the reconstructed image converges;

the holographic transformation unit is further configured for processing the reconstructed image after the second kind of amplitude constraint, which is seemed as a new round of target image and is iterative processed, and updating the counting of the iteration number until the error of the processed reconstructed image satisfies the preset precision threshold or the current number of iterations is up to the preset number threshold of the total iterations.

19. The holographic image display device according to claim 18, wherein the complex amplitude constraining unit is further configured for performing a third kind of amplitude constraint or complex amplitude constraint to the reconstructed image if the error of the reconstructed image does not converge, so that the amplitude or complex amplitude of the reconstructed image get out of partial extremum, and resetting the compensation factor to an initial value; the holographic transformation unit is further configured for processing the reconstructed image after getting out of the partial extremum, which is seemed as a new round of the target image and is iterative processed, and updating the counting of the iteration number until the error of the processed reconstructed image satisfies the preset precision threshold or the current number of iterations equals the preset number threshold of the total iterations.

20. A wearable apparatus comprises a wearable device, a display screen disposed on the wearable device and the holographic image display device according to claim 13, the display screen being coated with a reflection film or a holographic optical element film to form a virtual enlarged image of the projected display image generated by the holographic image display device.

21. The wearable apparatus according to claim 20, wherein the light resource device is one of a monochrome light resource system and a multi-color light resource system, the monochrome light resource system comprising monochrome lasers and a corresponding beam shaping unit, the monochrome light emitted from the monochrome lasers being collimated through the beam shaping unit and then incident to the spatial light modulator; the multi-color light resource system comprising a red laser emitter, a green laser emitter, a blue laser emitter and a corresponding beam shaping unit, in the multi-color light resource system, the light source device being further configured for controlling the laser emitters with the corresponding colors to emit in corresponding time-sharing sequence according to the time-sharing sequence in which the target hologram image with various colors is loaded by the signal processor, the corresponding color beams being collimated by the beam shaping unit corresponding to the laser emitters with the corresponding colors, and then being incident to the spatial light modulator; and/or the phase quantization unit is further configured for determining quantization order and quantization range of various color lasers according to the wavelength of various color lasers before performing phase quantization of the holographic phase image; and/or the determination unit is further configured for determining whether error of the reconstructed image satisfies a preset precision threshold or not, or determining whether the number of iterations corresponding to the reconstructed image is up to the preset number threshold of the total iterations or not, if the error of the reconstructed image is less than the preset precision threshold or the number of iterations corresponding to the reconstructed image equals the preset number threshold of the total iterations, it is to be determined that the reconstructed image satisfies the preset condition; and/or the determination unit is further configured for determining whether the number of iterations corresponding to the reconstructed image is greater than a preset threshold of the GS algorithm iterations if the error of the reconstructed image is greater than or equal to the preset precision threshold and the number of iterations corresponding to the reconstructed image is less than the preset number threshold of the total iterations; the complex amplitude constraining unit is further configured for performing a first kind of amplitude constraint to the reconstructed image with the target amplitude according to the GS algorithm if the number of iterations corresponding to the reconstructed image is less than or equal to the preset threshold of the GS algorithm iterations; the holographic transformation unit is further configured for processing the reconstructed image after the first kind of amplitude constraint, which is seemed as a new round of target image and is iterative processed, and updating the counting of the iteration number until the error of the processed reconstructed image satisfies the preset precision threshold or the current number of iterations is up to the preset number threshold of the total iterations; and/or the determination unit is further configured for determining whether the error of the reconstructed image converges or not if the number of iterations corresponding to the reconstructed image is greater than the preset number threshold of the GS algorithm iterations;

the complex amplitude constraining unit is further configured for performing a second kind of amplitude constraint to amplitude of the reconstructed image on the basis of weight factors corresponding to the preset target image and the reconstructed image as well as compensation factors, and accordingly accelerating convergence of the error of the reconstructed image, if the error of the reconstructed image converges; the holographic transformation unit is further configured for processing the reconstructed image after the second kind of amplitude constraint, which is seemed as a new round of target image and is iterative processed, and updating the counting of the iteration number until the error of the processed reconstructed image satisfies the preset precision threshold or the current number of iterations is up to the preset number threshold of the total iterations; and/or the complex amplitude constraining unit is further configured for performing a third kind of amplitude constraint or complex amplitude constraint to the reconstructed image if the error of the reconstructed image does not converge, so that the amplitude or complex amplitude of the reconstructed image get out of partial extremum, and resetting the compensation factor to an initial value; the holographic transformation unit is further configured for processing the reconstructed image after getting out of the partial extremum, which is seemed as a new round of the target image and is iterative processed, and updating the counting of the iteration number until the error of the processed reconstructed image satisfies the preset precision threshold or the current number of iterations equals the preset number threshold of the total iterations.

22. An onboard head-up display apparatus comprises a display screen and the holographic image display device according to claim 13, the display screen being coated with a reflection film or a holographic optical element film to form a virtual enlarged image of the projected display image generated by the holographic image display device.

23. The onboard head-up display apparatus according to claim 22, wherein the light resource device is one of a monochrome light resource system and a multi-color light resource system, the monochrome light resource system comprising monochrome lasers and a corresponding beam shaping unit, the monochrome light emitted from the monochrome lasers being collimated through the beam shaping unit and then incident to the spatial light modulator; the multi-color light resource system comprising a red laser emitter, a green laser emitter, a blue laser emitter and a corresponding beam shaping unit, in the multi-color light resource system, the light source device being further configured for controlling the laser emitters with the corresponding colors to emit in corresponding time-sharing sequence according to the time-sharing sequence in which the target hologram image with various colors is loaded by the signal processor, the corresponding color beams being collimated by the beam shaping unit corresponding to the laser emitters with the corresponding colors, and then being incident to the spatial light modulator; and/or the phase quantization unit is further configured for determining quantization order and quantization range of various color lasers according to the wavelength of various color lasers before performing phase quantization of the holographic phase image; and/or the determination unit is further configured for determining whether error of the reconstructed image satisfies a preset precision threshold or not, or determining whether the number of iterations corresponding to the reconstructed image is up to the preset number threshold of the total iterations or not, if the error of the reconstructed image is less than the preset precision threshold or the number of iterations corresponding to the reconstructed image equals the preset number threshold of the total iterations, it is to be determined that the reconstructed image satisfies the preset condition; and/or the determination unit is further configured for determining whether the number of iterations corresponding to the reconstructed image is greater than a preset threshold of the GS algorithm iterations if the error of the reconstructed image is greater than or equal to the preset precision threshold and the number of iterations corresponding to the reconstructed image is less than the preset number threshold of the total iterations; the complex amplitude constraining unit is further configured for performing a first kind of amplitude constraint to the reconstructed image with the target amplitude according to the GS algorithm if the number of iterations corresponding to the reconstructed image is less than or equal to the preset threshold of the GS algorithm iterations; the holographic transformation unit is further configured for processing the reconstructed image after the first kind of amplitude constraint, which is seemed as a new round of target image and is iterative processed, and updating the counting of the iteration number until the error of the processed reconstructed image satisfies the preset precision threshold or the current number of iterations is up to the preset number threshold of the total iterations; and/or the determination unit is further configured for determining whether the error of the reconstructed image converges or not if the number of iterations corresponding to the reconstructed image is greater than the preset number threshold of the GS algorithm iterations;

the complex amplitude constraining unit is further configured for performing a second kind of amplitude constraint to amplitude of the reconstructed image on the basis of weight factors corresponding to the preset target image and the reconstructed image as well as compensation factors, and accordingly accelerating convergence of the error of the reconstructed image, if the error of the reconstructed image converges; the holographic transformation unit is further configured for processing the reconstructed image after the second kind of amplitude constraint, which is seemed as a new round of target image and is iterative processed, and updating the counting of the iteration number until the error of the processed reconstructed image satisfies the preset precision threshold or the current number of iterations is up to the preset number threshold of the total iterations; and/or the complex amplitude constraining unit is further configured for performing a third kind of amplitude constraint or complex amplitude constraint to the reconstructed image if the error of the reconstructed image does not converge, so that the amplitude or complex amplitude of the reconstructed image get out of partial extremum, and resetting the compensation factor to an initial value; the holographic transformation unit is further configured for processing the reconstructed image after getting out of the partial extremum, which is seemed as a new round of the target image and is iterative processed, and updating the counting of the iteration number until the error of the processed reconstructed image satisfies the preset precision threshold or the current number of iterations equals the preset number threshold of the total iterations.

* * * * *